Aug. 23, 1949.  G. G. FLEISCHHAUER  2,479,825
CONVERTIBLE TOP COVER
Filed Nov. 5, 1947  2 Sheets-Sheet 1
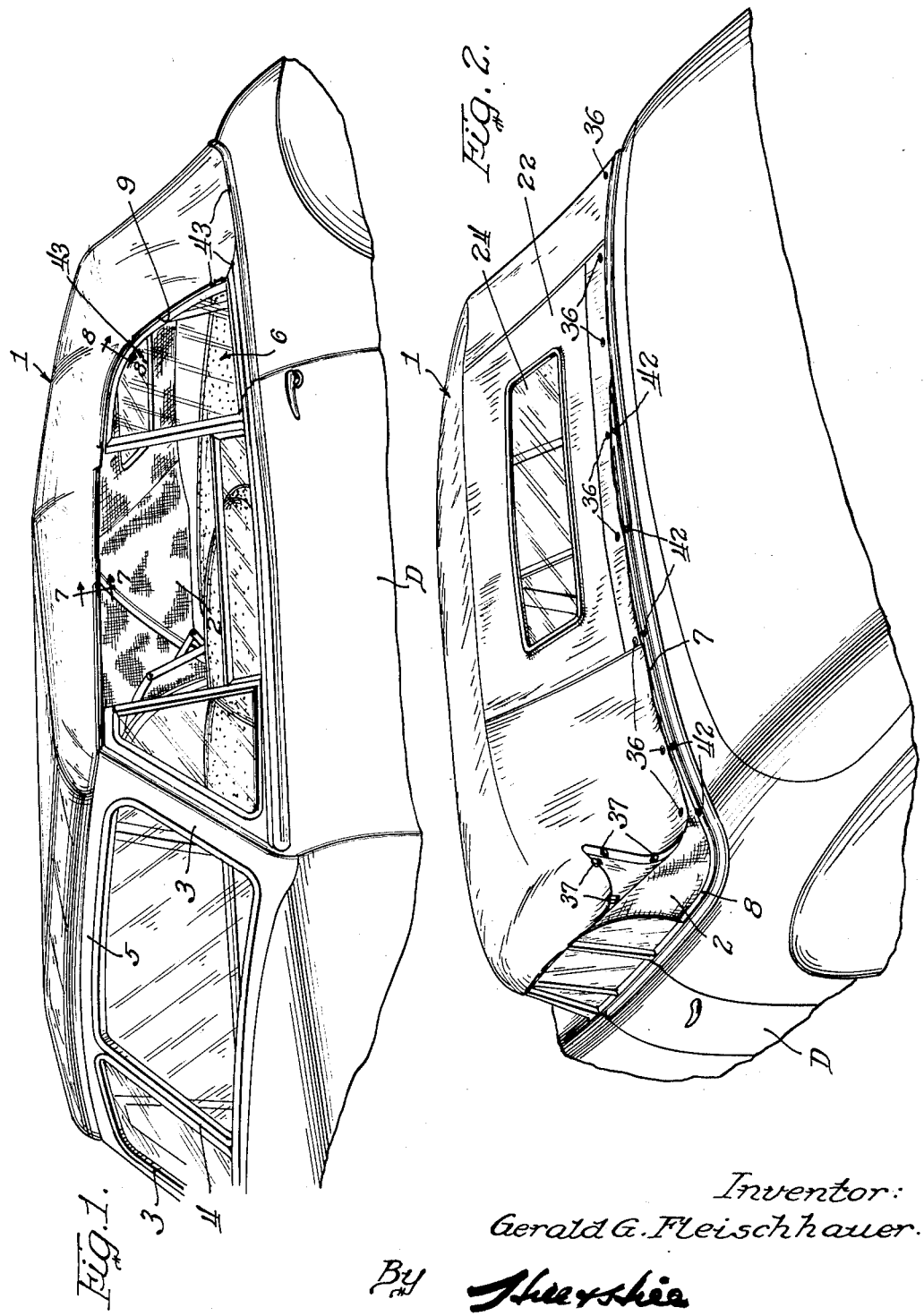
Inventor:
Gerald G. Fleischhauer.
By Thwaites
Attys.

Aug. 23, 1949.   G. G. FLEISCHHAUER   2,479,825
CONVERTIBLE TOP COVER
Filed Nov. 5, 1947                                 2 Sheets-Sheet 2
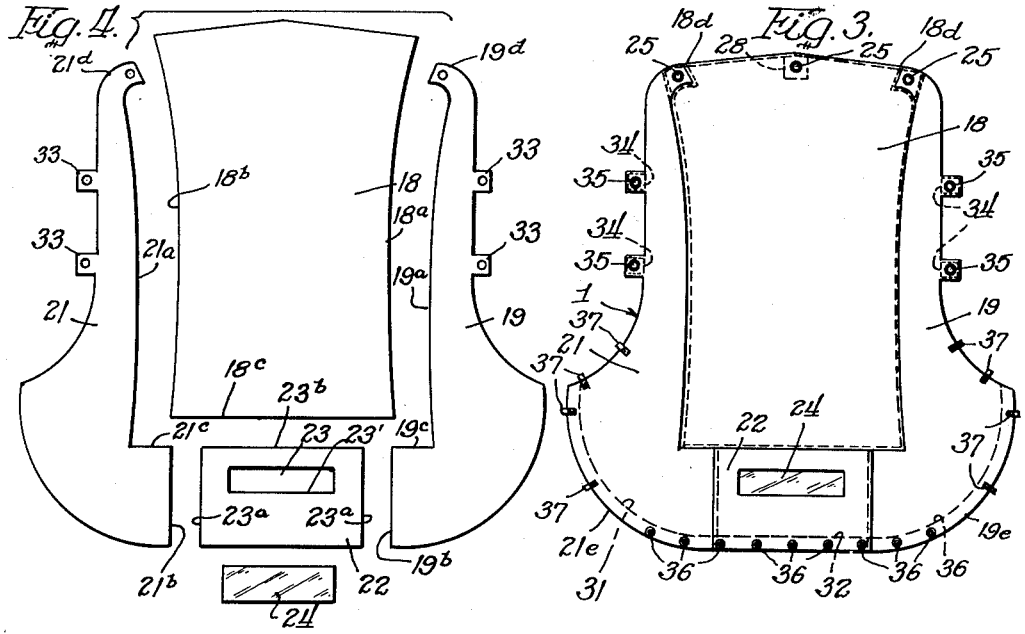
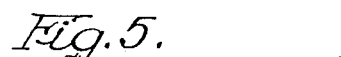
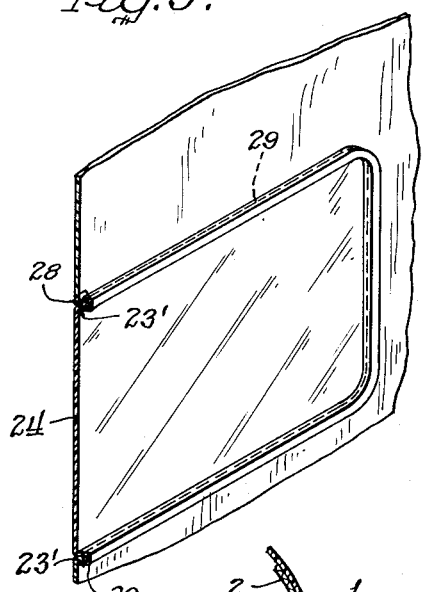
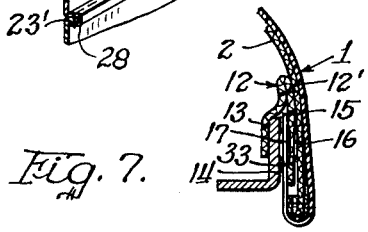
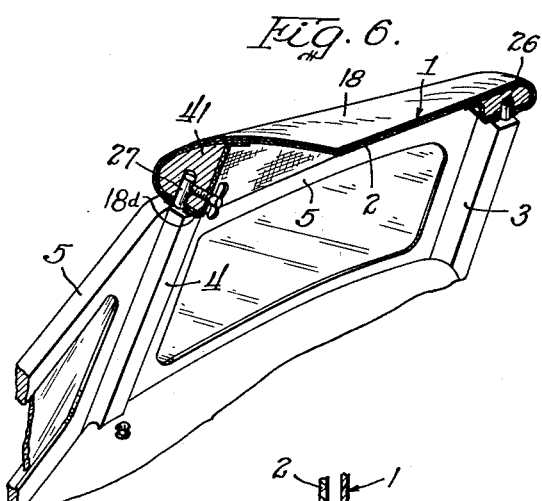
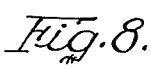
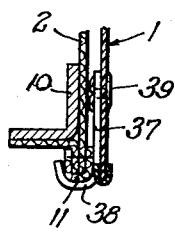
Inventor:
Gerald G. Fleischhauer.
By
Attys.

Patented Aug. 23, 1949

2,479,825

UNITED STATES PATENT OFFICE 2,479,825

CONVERTIBLE TOP COVER

Gerald G. Fleischhauer, Chicago, Ill.

Application November 5, 1947, Serial No. 784,190

3 Claims. (Cl. 296—136)

The invention relates generally to automobile top coverings, and more particularly to a cover for soft convertible tops.

In the past, one of the objections to convertible models has been the relative lack of durability of the canvas of the fabric automobile top as compared with the metal top of the closed or sedan type of body. This inherent weakness in the convertible usually results in the necessity of replacing the fabric after a few years of use, with the attendant additional expense.

Generally, the convertible top fabric comprises two plies or layers of soft light canvas or other woven material with a ply of rubber or the like interposed therebetween, to which the woven plies are suitably bonded. It will be apparent that such a top normally receives its hard usage during the winter months when it may be subjected to the action of snow, ice and harmful road dirt containing chemicals and the like, which may result in deterioration of the top or unsightly stains thereon, which are exceedingly difficult to remove. Likewise, the accumulation of dirt particles in the pores of the outer fabric will cause a wearing of the fabric due to the vibration or weaving of the top when the vehicle is in motion. While these conditions usually do not immediately result in leakage of the top, they do result in the deterioration of the outer fabric ply, thereby presenting an objectionable appearance, and where the fabric wears away deterioration of the exposed rubber usually rapidly follows.

The present invention contemplates the covering of the fabric top with a water and chemical proof member of suitable plastic or other material which may be semi-permanently installed on the vehicle top, and has among its objects the production of a protective top covering which will provide the desired protection, at the same time being smooth fitting and presenting a neat and attractive appearance.

Another object of the invention is the production of such a top covering which may be easily installed and removed as desired, and when so installed is of a semi-permanent character so that it may be retained on the top as long as the latter may be maintained in a raised position, the cover being so constructed that adequate visibility is provided through the rear window of the vehicle top.

A further object of the invention is the production of such a covering having novel means for retaining the same in proper position at all times so that the entire fabric top is efficiently protected.

A further object of the invention is the production of such a top covering which is simple in construction, relatively inexpensive to manufacture and which is so designed that undesired removal from a vehicle top is prevented.

Many other objects and advantages of the construction herein shown and described will be obvious to those skilled in the art from the disclosure herein given.

To this end my invention consists in the novel construction, arrangement and combination of parts herein shown and described, and more particularly pointed out in the appended claims.

In the drawings wherein like reference characters indicate like or corresponding parts:

Fig. 1 is a perspective view of a convertible top with the present invention applied thereto;

Fig. 2 is a perspective view of a convertible top, taken from the left rear quarter with the present invention partly applied thereto;

Fig. 3 is a more or less development of the assembled cover;

Fig. 4 is an exploded view in development of the main elements comprising the cover illustrated in Fig. 3;

Fig. 5 is a sectional view in perspective through a portion of the transparent rear panel;

Fig. 6 is a perspective view of a portion of a convertible windshield and the vehicle top showing the manner in which the present invention is applied thereto;

Fig. 7 is a sectional view taken approximately on the line 7—7 of Fig. 1; and

Fig. 8 is a sectional view taken approximately on the line 8—8 of Fig. 1.

I am aware that protective coverings have been used on convertibles in the transit thereof from the factory to the dealer, to prevent soiling of the top prior to the delivery of the car to the purchaser, but these devices have primarily comprised a temporary cover secured in position by means of tapes or strings tied to elements of the vehicle, to more or less hold the cover in place during transit. Such devices have not been form fitting, have not provided complete protection for the top, nor were they semi-permanently secured to the vehicle, the securing means merely preventing them from coming off of the top. The edges of such devices have not completely and efficiently covered all portions of the top, as the edges are relatively free except where directly fastened down, and no vision for the rear window is provided, the construction being strictly for temporary use and serving only the one function formerly performed by paper coverings or the like.

In contrast to such a device is that of applicant's which is of a semi-permanent character and is designed to remain on the car as long as the top is in a raised position, and when so installed presents the appearance of an integral part of the top rather than that of an accessory, the device being free of wrinkles and conforming to the top outline with the edges of the cover substantially co-extensive with the corresponding edges of the top and securely held in position throughout.

Referring to the drawings and particularly to Figs. 1 and 2, the present invention contemplates the use of a cover member indicated generally by the numeral 1 formed from a suitable plastic or other satisfactory material which is water resistant, the cover being suitably shaped to conform to the configuration of the fabric top 2. The convertible style of body in the example illustrated in Figs. 1 and 2, includes a windshield having side pillars or columns 3 and a center column 4, the respective columns being connected at their upper ends by the cross member 5. The body illustrated also is provided with a rear quarter window indicated generally by the numeral 6, which is common in the present day types of convertibles. The fabric top is generally secured to the body along its lower rear edge indicated at 7, the lower edges 8 of the side portions directly behind the quarter windows 6 being detachably secured to the body by snaps or other suitable cooperating means on the top and body. The forward edge 9 of the top fabric adjacent the rear edge of the quarter window 6 is usually permanently secured to a rigid top member 10, forming part of the top frame work or structure, the curvature of such member being complementary to the curved edge of the quarter window. As illustrated in Fig. 8, the adjacent edge of the top fabric along such member is usually provided with a bead 11, which bead extends along the free edge of the top directly above the doors to substantially the front edge of the top. As illustrated in Fig. 7, the edge of the top positioned above the doors D is usually secured to the top frame members by a longitudinally extending flap 12 of inverted U-shape in cross section to form an inner strip 13 adapted to be positioned behind the upwardly extending leg 14 of the top frame, and an outer strip 15, the latter having one portion 16 of a snap fastener engageable with a cooperating portion 17 mounted on the leg 14 of the frame, the flap 12 being secured to the top 2 by stitching 12' or other suitable means.

Referring to Figs. 3 and 4, it will be noted that the cover member 1 comprises a top portion 18, right and left side portions 19 and 21 respectively and a rear or back portion 22, the latter having an opening 23 therein in which is positioned a transparent sheet 24. The side edges 18a and 18b of the top portion 18 are secured to the corresponding edges 19a and 21a of the side portions 19 and 21 respectively. Likewise, the vertical edges 19b and 21b of the side portions are secured to the adjacent side edges 23a of the rear panel 22, the upper edge 23b of the rear panel and the upper edges 19c and 21c of the side panels being secured to the rear edge 18c of the top portion 18. As illustrated in Fig. 3, the inwardly extending ends 19d and 21d of the respective side portions underlie the top portion 18 adjacent the front edge 18d of the top portion, thereby forming a double thickness of material adjacent the front corners of the top portion 18. The two reenforced portions thus formed are each provided with an eyelet 25 of a size to permit insertion of the eyelet on the corner locking post 26 normally found on the top edge of the windshield of most convertible models, only one of such posts being illustrated in Fig. 6 of the drawings. Such constructions usually also include a similar center post 27, and the top portion 18 of the cover member is provided adjacent the center of the front edge with a reenforcing piece of material 28, the reenforced top portion thus formed being also provided with an eyelet 25 for receiving the post 27.

The transparent panel 24 may be secured to the rear portion 22 by any suitable means, as for example, as illustrated in Fig. 5, wherein the panel 24 is suitably formed to provide an inwardly extending peripheral channel 28 in which is inserted the edges 23' defining the opening 23, the edges 23' being secured in the channel 28 by stitches 29, cement or other suitable means, and it will be apparent that if stitching is to be employed the transparent panel 24 may be constructed of a relatively thin semi-rigid material capable of being formed and stitched in the manner illustrated. As illustrated in Fig. 3, the rear edges 19e and 21e are preferably provided with a peripheral reenforcing strip 31, and in like manner, the free edge of the back portion 22 is provided with a similar reenforcing strip 32 positioned on the inner side of the respective portions, and if desired, may be formed by folding the free edges of the respective portions under and securing the same in position to form a double thickness adjacent such edges.

As illustrated in Figs. 3 and 4, the side portions 19 and 21 are each provided with a pair of laterally extending flaps 33 which are each reenforced by an additional piece of material 34 stitched or otherwise secured to the respective flaps. Each of the flaps 33 are provided with an opening which may be defined by an eyelet 35 or other reenforcing element passing through both thicknesses of the reenforced flap. As illustrated in Fig. 3, the reenforced rear edge of the cover is provided with a series of button fasteners 36, while the edges of the side portions 19 and 21 are provided with a series of inwardly extending hook members 37, the details of which are clearly illustrated in Fig. 7, and as therein illustrated, the hooked ends 38 of the members 37 are of a size to engage the bead 11 forming the peripheral edge of the convertible top. The members 37 are secured to the cover 2 by any suitable means, as for example, a small rivet 39 and if desired, the material of the cover adjacent each of the members 37 may be reenforced in a manner similar to the reenforcement of the flaps 33, and as illustrated in Fig. 3, the members 37 adjacent the lower rear edge of the side portions 19 and 21 are reenforced by the strips 31.

It might be mentioned that while Fig. 3 would appear to show the member 1 as planar, this has been done only for the purposes of illustration of the details of assembly, and in the actual device the shape of the same would be three dimensional corresponding in general to the shape of the top.

The device is applied to the vehicle top in the following manner:

The top is first partially lowered to disconnect the front edge thereof from the upper cross member 5 of the windshield, thus exposing the studs 26 and 27. The front edge 18d of the cover is then positioned on the member 5 of the windshield with the studs 26 and 27 extending through the eyelets 25 after which the vehicle top is again brought down on the windshield and locked in position as indicated in Fig. 6, thereby firmly securing the front edge 18d of the cover between the windshield and the cross member of the top. The cover is then brought back over the top and the lower edge of the back portion 22 secured to the adjacent car body by the button fasteners 36, the latter being engaged with cooperating fasteners 42 which are normally provided on convertibles for fastening the protective boot employed when the top is lowered. Obviously, the button fastener 36 will be so positioned on the cover 1 that they will be properly aligned with the fasteners 42 provided by the car manufacturer, the particular spacing of the fasteners as well as the dimensions and shape of the cover depending upon the specific make of car on which the particular cover is to be applied. The remaining button fasteners on the portions 19 and 21 are then snapped into place and the respective members 37 engaged with the side edges of the top fabric, thereby securely attaching the respective edges of the cover to the top or car body. The relative proportions of the various elements, comprising the cover 1, are so selected that the cover will fit snugly over the car top 2, the material comprising the cover having sufficient give to permit the securing of the fasteners 36 and 37 in place, at the same time maintaining the entire cover smooth and taut. Likewise, the particular type member and spacing of the securing means will be dependent on the particular vehicle top on which the device is to be applied.

As illustrated in Fig. 7, the flaps 33 may be folded up underneath the strip 15 extending along the edge of the top 2 above the doors D and the eyelet 35 aligned with the cooperating elements 16 and 17 of the button fasteners, so that the latter may be engaged, with the flaps 33 extending between the frame member 14 and the strip 15, thus securing the adjacent edges of the cover 1 to the top structure. Obviously, the number of flaps 33 and the spacing therebetween will be dependent upon the construction of the car top on which the cover is to be applied.

As illustrated in Figs. 1 and 2, it will be apparent that the panel 24 is so positioned in the back portion 22 that it will overlie the rear window 43 in the car top. It will also be noted that when the cover is so applied to a car top it is form fitting and appears to be substantially an integral part of the car with no unsightly wrinkles or loose edges, thus completely covering and protecting the original car top. Likewise, the material employed may be translucent, opaque or colored as desired. All of the seams joining the various components of the cover are preferably of a waterproof type, or if desired, may be suitably cemented or otherwise bonded to provide a water tight joint therebetween.

Obviously, in removing the cover, the procedure heretofore described with respect to the installation thereof is merely reversed, the rear edges of the cover being unfastened, after which the top is partially lowered to permit removal of the front edge of the cover from the windshield, and it will be noted that when the car is locked the cover cannot be removed without first breaking into the car and partially lowering the top.

It will be obvious to those skilled in the art that my invention may be readily employed on all types of convertibles, the various proportions and dimensions of the device being modified to meet the specific requirements.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A detachable protective top cover for an automobile of the type having a windshield provided with a top rail and a convertible type top having side and front frame members with the front frame member of the top of the automobile resting on and detachably secured to the top rail of the windshield, said cover comprising a sheet of material fashioned to conform to the shape of the top to which it is to be applied, and having front, side, and rear portions, the front portion being of a greater length than the corresponding portion of the top to which it is to be applied to form a flap at the front edge of the cover adapted to be positioned and clamped between the top rail of the windshield and the front frame member of the top, and means carried by the side portions of the cover adapted to engage adjacent co-operating portions of the top structure for securing the adjacent side edges of the cover thereto, and the rear portion of the cover having securing members for engaging co-operating fastening means forming a permanent part of the automobile.

2. A detachable protective top cover for an automobile of the type having a windshield provided with a top rail and a convertible type top having side and front frame members with the front frame member of the top of the automobile resting on and detachably secured to the top rail of the windshield, said cover comprising a sheet of material fashioned to conform to the shape of the top to which it is to be applied, and having front, side, and rear portions, the front portion being of a greater length than the corresponding portion of the top to which it is to be applied to form a flap at the front edge of the cover adapted to be positioned and clamped between the top rail of the windshield and the front frame member of the top, said flap being constructed to engage a part of the means detachably connecting the top rail of the windshield and front frame member of the top, and means carried by the side portions of the cover adapted to engage adjacent co-operating portions of the top structure for securing the adjacent side edges of the cover thereto, and the rear portion of the cover having securing members for engaging cooperating fastening means forming a permanent part of the automobile.

3. A detachable protective top cover for an automobile of the type having a windshield provided with a top rail and a convertible type top having side and front frame members with the front frame member of the top of the automobile resting on and detachably secured to the top rail of the windshield, said cover comprising a sheet of material fashioned to conform to the shape of the top to which it is to be applied, and having front, side, and rear portions, the front portion being of a greater length than the corresponding portion of the top to which it is to be applied to form a flap at the front edge of the cover adapted to be positioned and clamped between the top rail of the windshield and the front frame member of the top, said flap being apertured to receive pins carried by the top rail forming a part of the connecting means between the windshield and the top, and means carried by the side portions of the cover adapted to engage adjacent co-operating portions of the top structure for securing the adjacent side edges of the cover thereto, and the rear portion of the cover having securing members for engaging co-operating fastening means forming a permanent part of the automobile, said rear portion of the cover having a transparent portion for providing vision therethrough.

GERALD G. FLEISCHHAUER.

REFERENCES CITED

The following references are of record in the file of this patent:

UNITED STATES PATENTS

| Number | Name | Date |
|---|---|---|
| 1,308,209 | Trumbly | July 1, 1919 |
| 1,559,458 | Rizianu | Oct. 27, 1925 |
| 2,048,461 | Mosgofian | July 21, 1936 |